United States Patent [19]
Rieth et al.

[11] 3,922,808
[45] Dec. 2, 1975

[54] CONTROLLED TROLLING APPARATUS

[75] Inventors: James E. Rieth, Grand Rapids; William M. Booth, Grand Haven, both of Mich.

[73] Assignee: James E. Rieth, Grand Rapids, Mich.

[22] Filed: Jan. 11, 1974

[21] Appl. No.: 432,599

[52] U.S. Cl. .................. 43/4; 73/170 A; 242/106
[51] Int. Cl.² ........................................ A01K 89/00
[58] Field of Search .... 43/4, 27.4; 242/106, 84.1 A; 73/170 A

[56] References Cited
UNITED STATES PATENTS

| | | | |
|---|---|---|---|
| 3,273,393 | 9/1966 | Spark | 73/170 A |
| 3,719,331 | 3/1973 | Harsch | 242/106 |
| 3,808,731 | 5/1974 | Lowrance | 43/4 |

*Primary Examiner*—Robert Peshock
*Assistant Examiner*—Daniel J. Leach
*Attorney, Agent, or Firm*—Price, Heneveld, Huizenga & Cooper

[57] ABSTRACT

A trolling reel for raising and lowering a weighted control line to which a fishing line is detachably secured includes a reversible drive motor coupled to control means for either automatically positioning the end of the control line at a desired distance from the lake bottom or at a depth corresponding to a desired water temperature.

13 Claims, 4 Drawing Figures

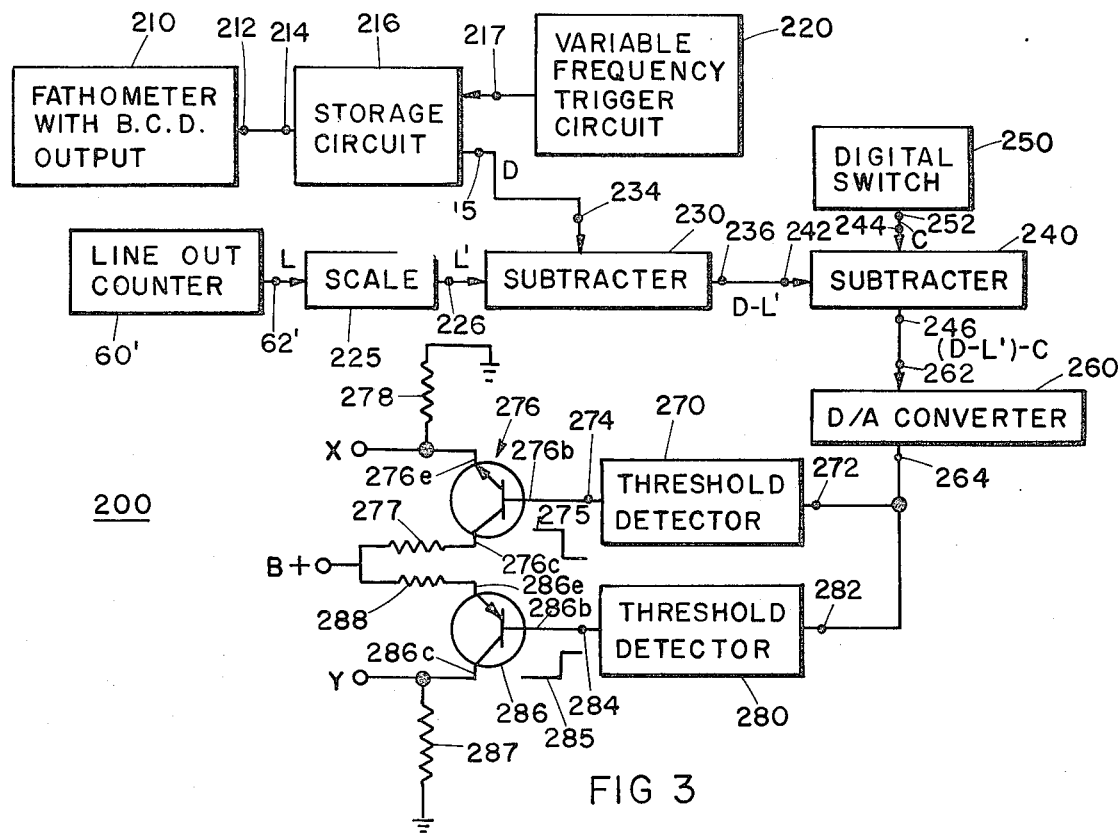
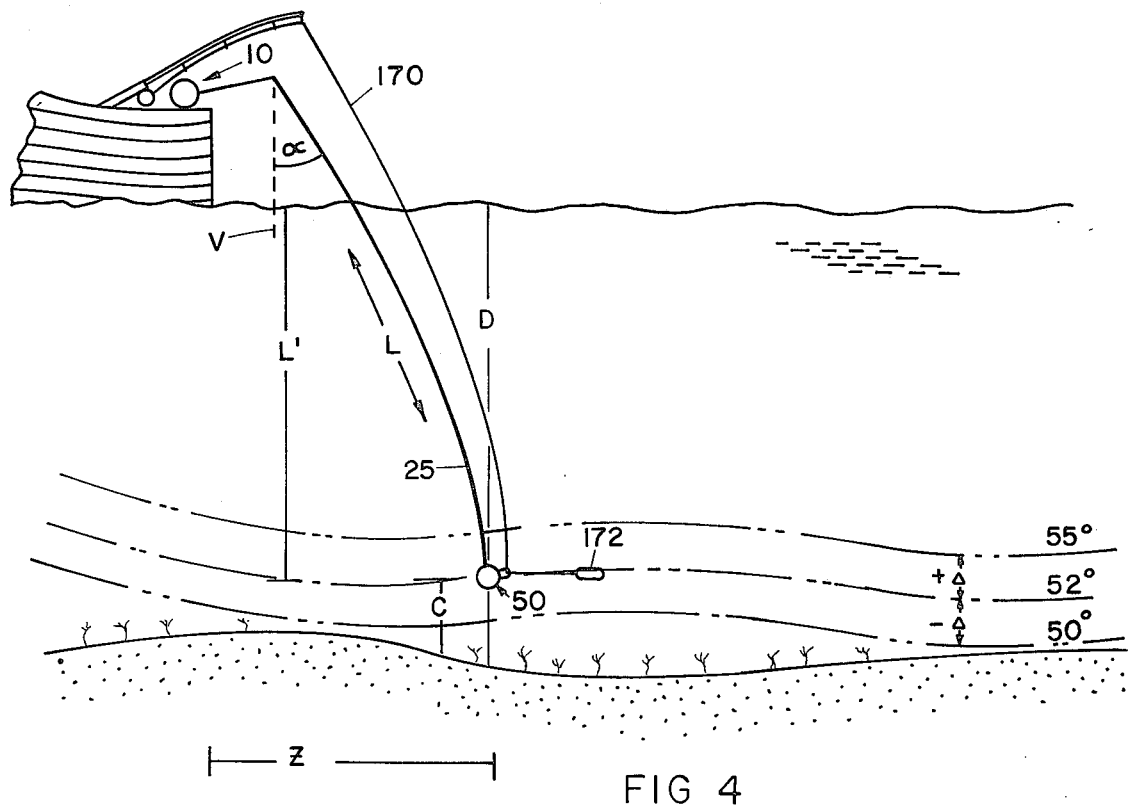

ature range.

CONTROLLED TROLLING APPARATUS

BACKGROUND OF THE INVENTION

The present invention relates to improved powered trolling apparatus and particularly to control means therefor.

When trolling in relatively deep water, it is desirable to use a control line with a heavy weight to hold the end of the control line at the desired depth. A fishing line is coupled to the control line in a detachable manner to maintain the fishing lure at the desired depth while trolling and provide normal play of the fishing line once a fish strikes and the fishing line separates from the control line. Many trolling reels are manually operated to raise and lower the control line. One such apparatus is described in U.S. Pat. No. 3,614,016 issued on Oct. 19, 1971 and assigned to the present assignee. Since it is necessary to raise and lower the control line to recouple the finishing line after each strike, and since the weighted control line is frequently payed out to lengths in excess of 100 feet; the operation of the manual reels can become quite burdensome. Recently, electrically driven trolling reels have been developed to overcome this problem. One such apparatus is described in detail in a copending application entitled TROLLING APPARATUS filed on July 24, 1972 Ser. No. 274,505 and assigned to the present assignee.

Many species of fish prefer known temperature waters or range at a generally predictable distance from the bottom of the lake or ocean being fished. Although equipment is available for measuring water temperature and depth, the control line (in a deep trolling system) must be lowered a measurable distance to the desired fishing depth. As the fishing vessel travels through the water the temperature at a given depth can vary greatly as can the depth of the water. Thus, for accurate continuous positioning of the fishing lure within a desired range of water temperatures or distances from the bottom, the water temperature and the water depth must continuously be monitored by the fishermen who must then continuously pay out or retrieve line to compensate for the temperature and depth variations encountered. This is necessary even with the improved electrically driven trolling reels.

SUMMARY OF THE INVENTION

The novel concepts of one aspect of this invention include a reversible motor driven trolling reel and control means including temperature sensing means at the end of a control line for actuating the motor for paying out and retrieving the control line to maintain the end of the line at a depth corresponding to a preselectable water temperature or range. Thus, as the temperature of the water varies as the vessel moves through the water, the reel is automatically driven to raise or lower the line to maintain a lure attached thereto within the desired temperature range.

In another aspect of this invention means are provided for measuring the depth of the water and control means develop a drive signal for actuating the reel motor to maintain the end of the line at a predetermined selectable distance from the bottom of the lake as the depth varies with motion of the boat.

It is an object, therefore, of the present invention to provide an improved trolling reel having a reversible motor drive and control means to automatically control the paying out and retrieving of the line to maintain an end of the line at a water depth corresponding to a desired temperature range or at a desired distance from the bottom.

Another object of the present invention is to provide a control system for a motorized trolling reel for controlling the motor to automatically maintain an end of the line attached to the reel within a desired temperature range.

Still a further object of the present invention is to provide a motor driven trolling reel and an electrical control system and depth sensing means coupled thereto for controlling the amount of line payed out by the reel to automatically maintain an end of the line at a predetermined distance from the bottom as the water depth varies.

These and other objects of the present invention will become apparent upon reading the following description thereof together with the accompanying drawings in which:

BRIEF DESCRIPTION OF THE DRAWINGS

FIG. 3 is an electrical circuit diagram in block form of a control system employed in conjunction with the circuit of FIG. 2 for controlling the reel to maintain the line at a desired distance from the bottom; and FIG. 4 is a schematic cross-sectional diagram of a lake illustrating the operation of the control systems shown in FIGS. 2 and 3.

DETAILED DESCRIPTION OF THE PREFERRED EMBODIMENT

Figure 1:
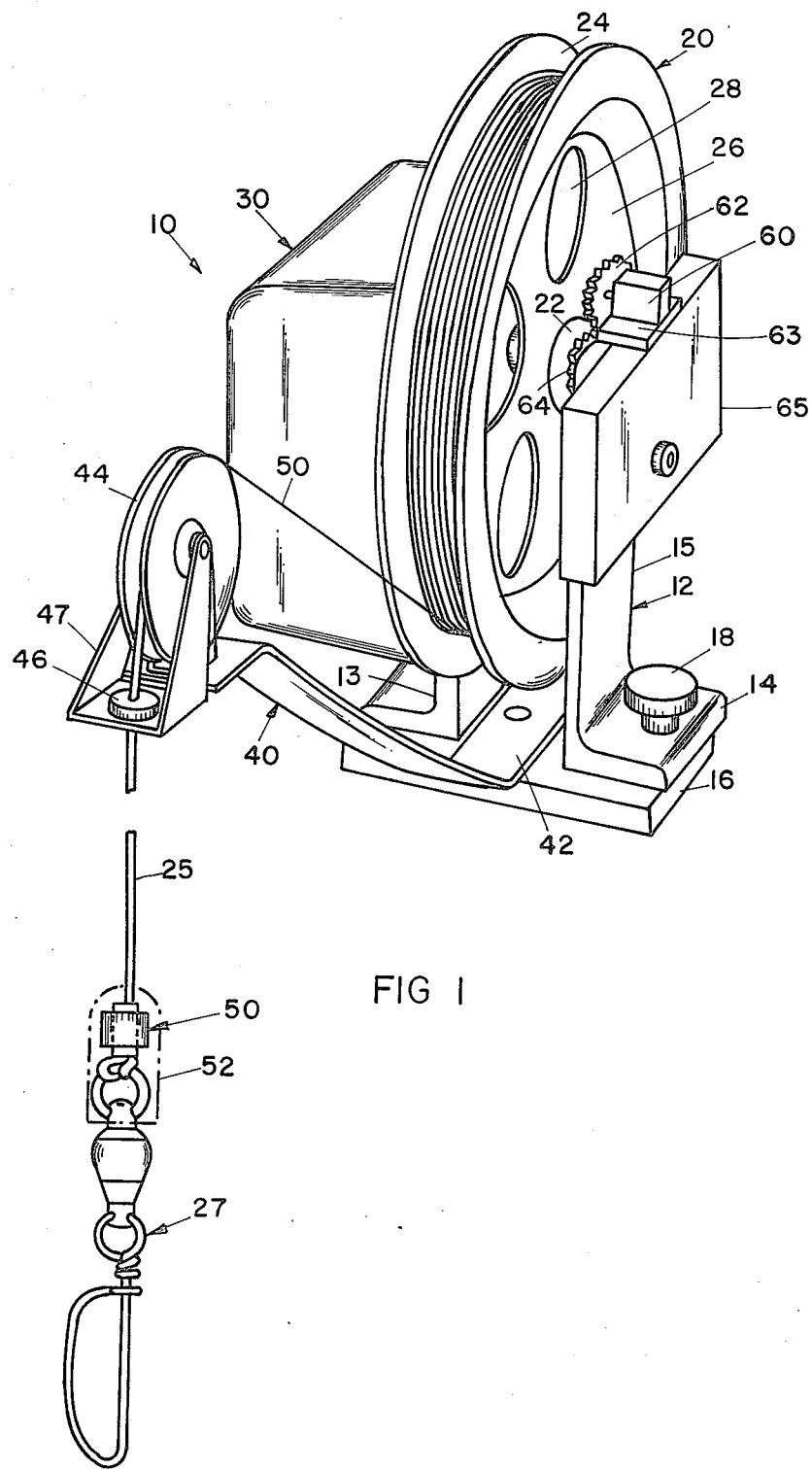
FIG. 1 is a front perspective view of the motorized trolling reel of the present invention.

Referring now to FIG. 1, there is shown a reel assembly 10 including a frame 12 to which is rotatably mounted a line reel 20 and a reel drive unit 30. The frame 12 includes a base 14 to which is integrally formed a pair of spaced vertically extending arms 13 and 15. The base 14 is adapted to be removably secured to a deck plate 16 by means of a pair of threaded bolts 18. The deck plate 16 in turn is secured to the transom or gunwale of a vessel by means of lugs (not shown). This mounting arrangement permits easy removal of the reel assembly when not in use.

The reel 20 is described in detail in the above identified copending application incorporated herein by reference so only a brief description is presented here. Reel 20 includes a central spindle 22 which is secured to a reel shaft rotatably supported between arms 13 and 15 by means of a pair of bearings fitted into the arms near the top. The shaft extends at one end into the reel drive unit 30 and is coupled to a reversible drive motor 32 (FIG. 2) to be rotatably driven thereby as described below. The reel 20 is of cast aluminum having a circumference of approximately 2 feet with a channelled perimeter 24 for holding a control line 25 therein. A web 26 extends between spindle 22 and channel 24 of the reel and includes a plurality of spaced apertures 28 which serves both to reduce the material cost of the reel and provide means for coupling control line 25, an electrical conductor, to the frame of the reel assembly as described in detail in the application identified supra.

The reel assembly includes a flexible action arm 40 secured at one end 42 to base 14 of frame 12 and extending outwardly and upwardly therefrom supporting a guide wheel 44 at the opposite end thereof. A guide bushing 46 is mounted in a pivot bracket 47 pivotally attached to the axle of wheel 44. The control line 25 is anchored at one end to the reel 20 and extends from the reel over guide wheel 44 and through bushing 46 where it is positioned over the edge of the boat for lowering into the water. The free end of line 25 includes a temperature sensing means 50 such as a thermistor electrically coupled to the conductive line 25 and potted in an insulative material 52 (shown in phantom in FIG. 1) to prevent electrical shorting of the thermistor or other water damage. Mechanically coupled to the end of line 25 is a clip 27 for connecting the line to a conventional releaseable clip or weight with releaseable clip (not shown) to releaseably hold a fishing line.

The reel assembly 10 further includes a revolution counter 60 which has a shaft geared to the shaft of the reel by means of a counter gear 62 engaged by a counter drive gear 64 secured to the shaft of the reel. A suitable bracket 63 mounts counter 60 to arm 15. Counter 60 is a commercially available unit which, as described below, is electrically coupled to the control circuit to provide electrical signals representative of the revolutions of the counter shaft. Since the reel diameter and ratio of gears 62 and 64 is known, the signals from counter 60 are directly related to the number of feet of line 25 payed out from reel 20. Counter 60 is mounted to the reel frame by bracket 63. Below bracket 63 there is a circuit box 65 which houses the electrical control circuitry employed.

Figure 2:
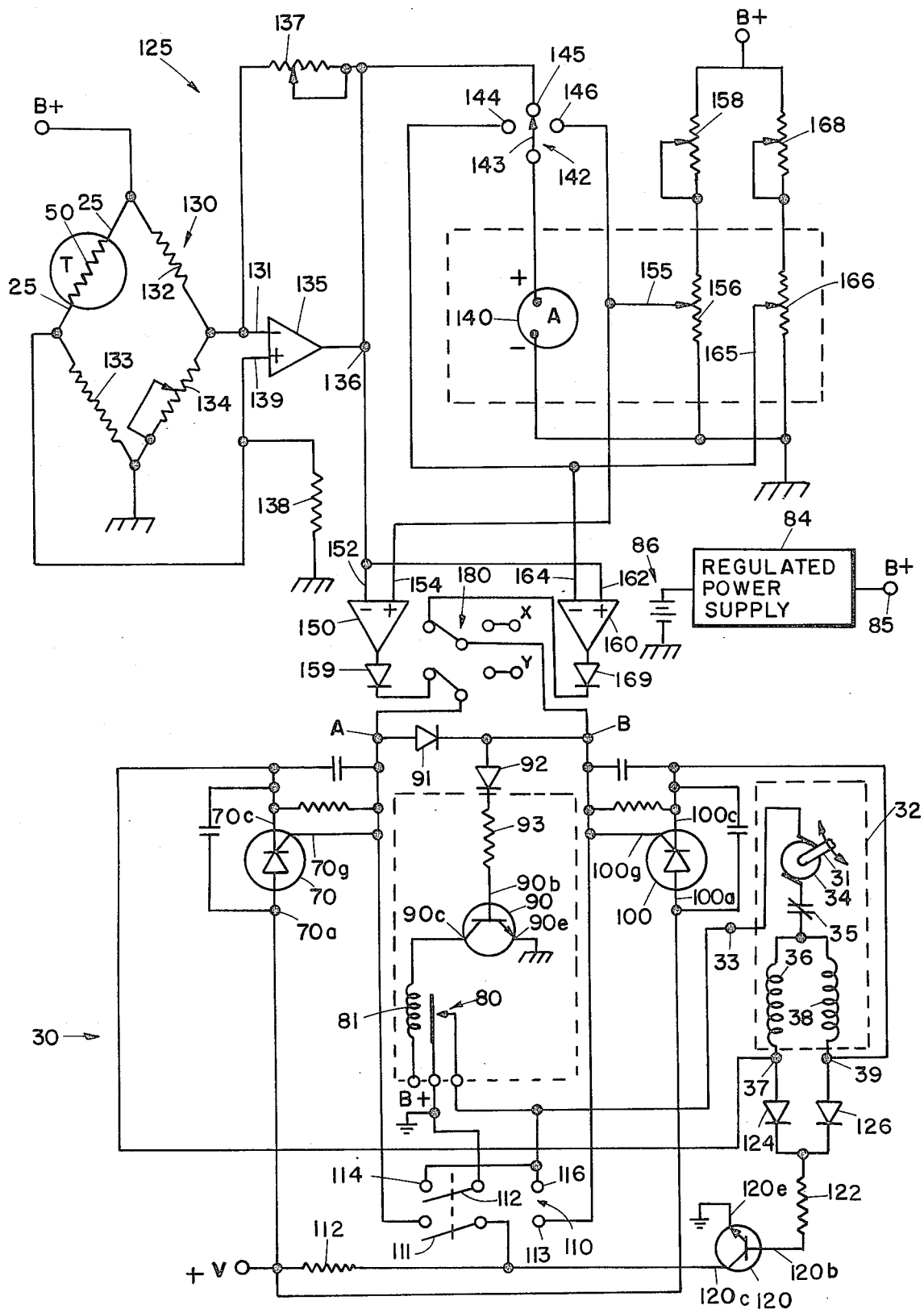
FIG. 2 is an electrical circuit diagram in schematic form of one embodiment of the control circuit for the motorized reel shown in FIG. 1.

Attached to frame arm 13 is the reel drive unit 30 which provides powered drive for the reel 20 and self-braking such that once the line has been payed out or retrieved a desired length, the drive is deactivated and secures the reel without requiring separate reel braking means. The reel drive unit 30 includes a reversible direct current electric motor 32 (FIG. 2) having a drive shaft 31 coupled to the reel shaft. A motor armature 34 is mechanically coupled to shaft 31 and electrically coupled in series with the contacts 35 of an integral overload relay. An electrical terminal 33 is coupled to a side of the armature remote from contacts 35. A first field winding 36 is coupled at one end to contacts 35, as shown in FIG. 2, and at an opposite end to input terminal 37. Current through winding 36 rotates the motor shaft and reel 20 for retrieving control line 25. A second field winding 38 also has one end coupled to contacts 35 and an opposite end coupled to an input terminal 39. Current through winding 38 rotates reel 20 for paying out line 25.

Although the preferred embodiment employs an electric motor for powering the reel, it is to be understood that a hydraulic or pneumatic motor with suitable control valves in place of the field windings could also be employed. Having described the mechanical structure of the motorized reel unit 10 and the electrical elements of the motor therefor, a description of the control circuit for selectively supplying motor 32 with current for automatic operation of unit 10 follows.

Current for the reel motor 32 is supplied from an electrical energy source +V (FIG. 2) which can be the vessel's 12 volt system. To actuate motor 32 for retrieving line, and SCR 70 is provided and has an anode terminal 70a coupled to the +V supply and a cathode terminal 70c coupled to input terminal 37 associated with winding 36 of motor 32. The output terminal 33 of the motor is returned to the vessel's electrical system ground, indicated as earth ground in the diagram, through a pair of relay contacts 80 which normally are in an open position. Thus, the current path includes the SCR 70 and contacts 80, both of which must be actuated or closed, respectively, to cause the actuation of the motor.

SCR 70 is actuated by means of a positive going trigger signal applied at terminal A coupled to the gate terminal 70g of the SCR. This control signal, which is developed as described below in detail, is also applied to a base terminal 90b of a transistor 90 by means of a first steering diode 91, a second steering diode 92 and a current limiting resistor 93. Transistor 90 has an emitter terminal 90e coupled to ground and a collector terminal 90c coupled to a relay coil 81 associated with contacts 80 and further coupled to the output terminal 85 of a regulated B+ supply 84. Supply 84 receives power from a battery 86 having its remaining terminal coupled to chassis ground as seen in FIG. 2. Collector current through transistor 90 and coil 81 closes switch contacts 80. Thus, the positive going control signal at terminal A triggers SCR 70 into conduction as well as closes contacts 80 thereby completing the current path through motor winding 36 from the +V supply to ground thereby actuating the motorized reel for retrieving line.

As long as the control signal is present at terminal A, motor 31 will be actuated. When the signal is removed from terminal A (i.e., changes for example, from a logic "1" to a logic "0" state), SCR 70 which is latched into conduction will tend to continue to conduct until transistor 90 is rendered nonconductive by the reduced base voltage applied thereto which opens switch contacts 80 thereby interrupting the current path from the cathode to anode of the SCR which in turn renders SCR 70 nonconductive. A similar circuit arrangement is provided for actuating winding 38 of motor 32 for paying out control line 25 from the reel. Thus, an SCR 100 is provided and has an anode terminal 100a coupled to the +V supply, a gate terminal 100g coupled to a second control signal input terminal B and a cathode terminal 100c coupled to input terminal 39 associated with winding 38. Terminal B is also coupled to the anodes of steering diode 92 such that a positive going signal applied to terminal B will trigger SCR 100 as well as render transistor 90 conductive thereby completing the current path through motor winding 38 to actuate motor 32 to pay out the control line. Each of the SCR's 70 and 100 includes conventional gate protection and spike suppression capacities and resistors as seen in FIG. 2.

In addition to controlling motor 32 by signals at terminals A and B as described, the reel drive unit 30 includes a manually operated switch 110 which can be employed if desired to actuate the motor. Switch means 110 comprises a double pole-double throw switch which is spring-loaded to be in the normally "off" position (i.e., centered). One switch arm 111 is coupled to the +V supply by means of a resistor 112. Switch 110 can be positioned momentarily either in a first position (to the left in FIG. 2) for applying a positive signal from the +V supply to the gate 70g of SCR 70 for triggering the SCR into conduction and closing the ground return path for winding 36 via switch arm 112 which is coupled directly to ground and the associated contact 114 which is coupled to terminal 33 of the motor 32. Switch 110 also can be moved to the right such that arm 111 engages a contact 113 for applying a triggering voltage to gate 100g of SCR 100 while arm 112 engages contact 116 to complete the ground return path for the motor. Thus, motor 32 is actuated either manually by switch 110 or by control signals applied to terminal A for retrieving line or applied to terminal B for paying out line.

A protection circuit comprising a transistor 120 is provided to prevent simultaneous actuation of both SCR's. Transistor 120 has a collector terminal 120c coupled to resistor 112 and an emitter terminal 120e coupled to ground. A base terminal 120b is coupled to terminal 37 of the motor via a current limiting resistor 122 and diode 124. Base 120b is also coupled to terminal 39 of the motor through a diode 126. The collector terminal 120c is further coupled to switch contact 111 such that in the event the motor is in operation and, therefore, terminal 37 or 39 has a positive voltage thereat, transistor 120 will be rendered conductive in a saturation mode such that collector 120c will be effectively at ground potential, thus grounding contact 111. Thus, in the event switch 110 is inadvertently moved to one of the momentary closed positions, it will apply to positive gate signal to the SCR's and prevent both of the motor windings from being activated at the same time.

The circuit means for developing control signals which are applied to input terminals A and B of the motor control circuit for automatically controlling the drive motor for the motorized reel to achieve the automatic positioning of the end of control line 25 is now discussed in detail.

A temperature control circuit 125 (FIG. 2) includes sensing means for sensing the water temperature at the level of the fishing lure 170 (FIG. 4). The sensing means comprises a thermistor 50 coupled to the end of the electrical control line 25, as shown in FIGS. 1 and 4, to be immersed in the water at the level of the lure. Line 25 is coupled to a bridge circuit 130, as seen in FIG. 2, to form one leg of the bridge circuit. The interconnection of cable 25 to the bridge circuit 130 is disclosed in detail in the above identified copending application and basically involves the use of a rotary contact arrangement for coupling fixed conductors extending from the control circuit to the end of conductor 25 which moves with motorized reel.

Bridge circuit 130 includes a second resistor 132. A third resistor 133 and a variable calibration resistor 134. The junction of resistors 50 and 132 is coupled to the regulated B+ supply while the junction of resistors 133 and 134 is returned to chassis ground. An operational amplifier 135 is coupled across the bridge circuit to amplify the developed differential voltage which varies with temperature variations as the resistance of thermistor 50 varies. Amplifier 135 thereby provides a temperature representative signal at its output terminal 136. An adjustable gain controlling resistor 137 is coupled from output terminal 136 to one of the amplifier input terminals 131 while the remaining input terminal 139 is coupled to ground by means of a resistor 138.

For calibration of the bridge, the thermistor 50 is inserted in a reference fluid such as ice water and resistor 134 adjusted until the output of amplifier 135 supplies a signal to a read-out meter 140 calibrated in degrees Fahrenheit such that the meter will read 32° or whatever reference temperature is employed. A meter select switch 142 is provided and has a contact 143 which is movable between a fixed contact 144 corresponding to a high temperature calibrate position and a switch contact 145 coupled to amplifier output terminal 136 for normal operation. Switch 142 also includes a fixed contact 146 corresponding to a low calibrate position.

To develop the control signals which are applied to terminals A or B of the motor control circuit, the analog output signal at terminal 136 of amplifier 135, which varies with detected temperature conditions, as applied to a signal input terminal 152 of a first comparator 150 and the input terminal 162 of a second comparator 160. The remaining input terminal 154 of comparator 150 is coupled to the wiper arm 155 of a low temperature limit potentiometer 156 and to contact 146 of switch 142. Resistor 156 has one terminal coupled to chassis ground and the remaining terminal coupled to the regulated supply voltage B+ through a calibration rheostat 158. The remaining input terminal 164 of comparator 160 is coupled to the wiper arm 165 of an upper temperature limit potentiometer 166 and to contact 144 of switch 142. Resistor 166 has one terminal coupled to chassis ground and the remaining terminal coupled to the regulated B+ supply through a calibration rheostat 168.

Thus, terminals 154 and 164 of the respective comparators are coupled to reference voltages selected by means of potentiometers 156 and 166, respectively, to set the upper and lower temperature limits between which the end of control line 25 is to be maintained. By referring to FIGS. 2 and 4, for example, where it is desired to maintain the fishing lure 170 attached at the end of a fishing line 172 in turn releasably held to the end of the control line 25 between the temperature range of 50° and 55°, the thermoclines of which are shown in FIG. 4, the lower limit potentiometer 156 which is calibrated in degrees Fahrenheit would be set to the 50° point while the upper limit potentiometer 166, also calibrated in degrees Fahrenheit, would be set to the 55° position. To assure the accuracy of the settings of these potentiometers, rheostats 158 and 168 are provided and calibration is achieved as follows.

Once the control circuit has been calibrated as discussed above against a known temperature, switch 142 is first switched to the low temperature cal position 144 and with the potentiometer 156 set at the desired low temperature limit, rheostat 158 is adjusted for a reading on meter 140 corresponding to the desired low temperature limit. Similarly, switch 142 is moved to the upper cal position 146 and with potentiometer 166 set to the desired upper temperature limit, calibration rheostat 168 is adjusted until meter 140 reads the desired upper temperature limit. Once this is accomplished, switch 142 is returned to the operating position 145. Thus, the voltage on wiper arm 155 will be at a fixed predetermined value which bears a direct relationship to the desired lower temperature limit while the voltage on wiper arm 165 of potentiometer 166 will be at a selectable value directly corresponding to the upper temperature range. These voltages, when applied to comparators 150 and 160, therefore, provide the reference voltages for the comparators while the control signals at terminals 152 and 162 provide the temperature representative signals.

If the detected water temperature is above the desired maximum temperature, the signal at terminal 162 will exceed that of the reference voltage at input terminal 164 of comparator 160 which will switch from a logic 0 output state to a logic 1 output state. The resultant positive output voltage from comparator 160 is applied to terminal B through a steering diode 169 and switch 180 to apply a control signal thereto which actuates motor 32 as described above to lower line 25 and, therefore, the connected lure 170. Similarly, if the detected water temperature is below the preset lower limit, comparator 150 will similarly switch from a logic 0 output to a logic 1 output signal applied to terminal A through steering diode 159 and switch 180 causing actuation of the motorized reel for raising the control line and the lure.

In this manner, therefore, the temperature control circuit 125 shown in FIG. 2 will provide automatic control signals to reel control circuit 30 for positioning the fishing lure 170 to track within a desired temperature range indicated as + and −Δ in FIG. 4, which range is selectable by the operator. The operator can manually operate the control of the motorized reel by means of switch 110 by decoupling the temperature control circuit from the motor control circit by means of the three-position double pole switch 180 coupled between diodes 159 and 169 and terminals A and B, respectively, as seen in FIG. 2. Switch 180 further provides means for switching from a temperature controlled system to a depth controlled system, shown in block diagram form in FIG. 3, as now discussed.

When switch 180 is moved to the depth regulated position whereby the movable contact arms are coupled to input terminal X and Y, as seen in FIG. 2, the motor control circuit is coupled to the depth controlling circuit 200 shown in FIG. 3 at interconnected output terminals X and Y thereof. Circuit 200 includes a conventional, commercially available fathometer 210 of the type which has a digital display and a binary coded decimal (BCD) output corresponding to the depth instantaneously displayed by the fathometer. Thus, the signal at output terminal 212 of the fathometer will be continuously varying as the boat travels through the water and the depth of the water varies. The BCD signal at output terminal 212 is applied to an input terminal 214 of a conventional digital storage circuit 216 which receives trigger signals at a trigger input terminal 217 from a variable frequency oscillator circuit 220.

Circuit 220 is a relatively low frequency oscillator of conventional design to periodically provide a pulse to the storage circuit 216 for shifting the input signal applied to terminal 214, and stored at the occurrence of the preceding output pulse from circuit 220, to output terminal 215 of the storage circuit. The frequency of the trigger pulses generated by circuit 220 is adjustable to compensate for the motion of the boat since the depth of water immediately below the boat can vary from the depth of water at which the lure 170 (FIG. 4) is positioned when the boat is in motion. As the boat speed increases, distance Z (FIG. 4) of the lure from the boat tends to increase. The time required for the boat to travel distance Z, however, remains relatively constant. Thus, once oscillator 220 is initially adjusted it need not normally be readjusted.

Circuit 200 also includes a line-out counter circuit 60' which receives signals from the counter 60 (FIG. 1) attached to the motorized reel and provides a BCD signal indicating the amount of line (distance L, FIG. 4) which has been payed out. Counter circuit 60' may include a conventional pulse counter circuit for converting pulses from counter 60 into the BCD format in the event counter 60 takes the form of a simple switch arrangement. Counter 60 (FIG. 1) can, however, be of the type which supplies BCD signals directly to the output terminal 62' of circuit 60'.

Output terminal 62' is coupled to a scaling circuit 225 which multiplies (i.e., amplifies) signals representative of the actual length of the line by a scale factor to provide a corrected signal L' at output terminal 226 thereof which corresponds to the approximate vertical distance of the line 25 in the water. This distance is illustrated in FIG. 4. The scale factor desired can be ascertained to the required accuracy trigonometrically by taking the cosine of angle $\alpha$ which is the angle line 25 makes and a vertical reference line V as seen in FIG. 4.

Circuit 225 is an operational amplifier with a series of selectable feedback resistors to adjust its amplification factor (less than unity) for a desired angle $\alpha$. In some applications, since angle $\alpha$ will normally be approximately 15° for a typical troling speed of 4–5 mph, the gain trolling circuit 225 can be fixed. A selector switch for selecting the gain of the amplifier can be calibrated in degrees of the actual angle $\alpha$ can be measured to determine the proper setting.

The adjusted line length signals L' are applied to a subtracter circuit 230 which also has an input terminal 234 coupled to output terminal 215 of storage circuit 216. Subtracter circuit 230 is a conventional four bit subtracter for providing a binary different signal representative of the quantity D−L'. This dimension (D−L') corresponds inn close approximation to the distance of the weight 50 and, therefore, lure 170 from the bottom of the lake or ocean. Output terminal 236 of the subtracter is coupled to an input terminal 242 of a second subtracter circuit 240 which receives a selectable distance representative digital signal at a second input terminal 244. The selectable signal is derived by a presettable digital switch 250 which provides a BCD output signal at terminal 252 thereof representative of a distance C (FIG. 4). Distance C is the distance from the bottom at which it is desired to maintain lure 170.

The output of subtractor subtracter 240 at output terminal 246 thereof is representative of the quantity (D−L')−C. This quantity may be positive or negative depending upon whether the weight 50 is above or below the desired distance from the bottom as preset in switch 250. The digital signal representative of a positive or negative number is applied to input terminal 262 of a digital-to-analog converter circuit 260. Circuit 260 is of conventional design and converts the output signal to positive or negative going analog signals which are applied to an output terminal 264.

Terminal 264 is coupled to an input terminal 272 of a first threshold detector 270 and an input terminal 282 of a second threshold detector 280. When weight 50 is a distance from the bottom greater than the desired distance, the output signal from converter 260 will be a positive going signal. Detector 270 responds only to positive going signals in excess of a predetermined magnitude and applies a positive going output signal 275 to an output terminal 274 coupled to the base terminal 276b of an NPN transistor 276.

As long as the lure remains a greater distance from the bottom than preset distance C, signal 275 will remain positive and biases transistor 276 into conduction. Collector terminal 276c is coupled to the B' supply through resistor 277 while emitter 276e is coupled to ground through an emitter resistor 278. The junction of resistor 278 and emitter terminal 276e is coupled to terminal X which is coupled to the motor control circuit through switch 180 shown in FIG. 2. Thus, in this condition, with transistor 276 conducting in a saturation mode of operation, a positive voltage will be developed across resistor 276 and applied to terminal X and through switch 180 to control terminal B. As described above, SCR 100 and transistor 90 will be actuated thereby to supply current to winding 38 associated with motor 32 thereby lowering line L until the output of subtracter circuit 240 and, therefore, converter 260 falls below the threshold voltage of detector 270. As with the thermally controlled system, the threshold detector is set for a voltage corresponding to a distance Δ within which the lure is desired to be maintained.

In the event the weight is too close to the bottom, the output signal from converter 260 will be a negative going signal. Detector 280 is designed to respond only to negative going signals in excess of a predetermined magnitude to provide at output terminal 284 thereof a negative going control signal 285 as seen in FIG. 3. The negative going signal is applied to base terminal 286b of a PNP transistor 286. The collector terminal 286c of transistor 286 is returned to ground through resistor 287 while the emitter terminal 286e is coupled to the B+ supply through resistor 288. With the negative signal 285 applied to base 286b, transistor 286 conducts in a saturation mode of operation to apply a positive going signal across output resistor 287. Terminal Y, coupled to the junction of resistor 287 and collector terminal 286c, is also coupled to the motor control circuit, as seen in FIG. 2, and with the positive signal applied to terminal Y, control terminal A of the motor control circuit receives a positive going signal which actuates SCR 70 to provide motor control current through winding 36 of motor 32 to raise the line L until the voltage from converter 260 falls below the threshold voltage of detector 280.

Thus, with switch 180 in the depth control position, the motorized reel is controlled to automatically maintain the lure within a desired selectable distance (C) from the bottom.

It will become apparent to those skilled in the art that various modifications to the preferred embodiment can be made. For example, the temperature control circuit may include a control meter of the type which includes switch contacts and which is commercially available for use in oven control systems. Such units can be coupled to a voltage source to provide signals to terminal A and B of the temperature control circuit 125 of FIG. 2 for actuating the reel drive circuit. Also, circuit changes to the temperature control or depth control circuits can be made to accommodate, for example, different temperature sensing means or different fathometers which, although not providing a BCD output signal, provide a depth representative signal which can be employed to derive the desired signal employed to control the motorized reel. These and other modifications to the preferred embodiment will, however, fall within the spirit and scope of the present invention as defined by the appended claims.

The embodiments of the invention in which an exclusive property or privilege is claimed are defined as follows:

1. A powered trolling apparatus for use on a vessel comprising:
   a frame member;
   a reel mounted to said frame member and including a control line coupled thereto;
   a reversible electric motor coupled to said reel for paying out and retrieving said control line from said reel such that an end of said control line can be immersed in the water;
   means for detecting the temperature of water at a reference point on said control line; and
   a temperature control circuit coupled to said detecting means and to said drive means for actuating said drive means to pay out or retrieve said control line wherein said temperature control circuit includes means for providing selectable electrical reference signals representative of upper and lower temperature limits, and comparator means coupled to said detecting means, to said providing means and to said drive means for developing electrical signals applied to said drive means to actuate said drive means when the detected water temperature is above or below said upper or lower limits, respectively, to raise or lower said reference point on said control line in the water to maintain said reference point on said control line within said temperature limits.

2. The apparatus as defined in claim 1 wherein said control line is a two-wire electrical conductor, wherein said reference point is an end of said conductor which is lowered into the water and said detecting means includes a temperature responsive device coupled between said wires of said conductor at said end.

3. The apparatus as defined in claim 2 wherein said comparator means includes a first comparator circuit coupled to said detecting means and to said means for providing signals representative of said upper temperature limit for developing a control signal applied to a first output terminal of said temperature control circuit when the detected temperature exceeds the upper temperature limit, and a second comparator circuit coupled to said detecting means and to said means for providing signals representative of said lower temperature limit for developing a control signal applied to a second output terminal of said temperature control circuit when the detected temperature is below the lower temperature limit.

4. The apparatus as defined in claim 3 wherein said drive means includes a motor control circuit having first and second input terminals coupled to said first and second output terminals of said temperature control circuit, respectively, a power source, and switch means coupled to said first and second input terminals and to said reversible motor for applying drive signals to said motor selectively actuating said motor for paying out or retrieving control line from said reel when said end of said line is outside said selected temperature limits.

5. A powered trolling apparatus for use on a vessel comprising:
   a frame member;
   a reel mounted to said frame member and including a control line coupled thereto;

drive means coupled to said reel for paying out and retrieving said control line from said reel such that an end of said control line can be immersed in the water;

means for measuring the depth of water through which the vessel is passing and developing an electrical signal representative thereof;

means for generating an electrical signal representative of a selectable distance from the bottom at which an end of said control line is to be maintained; and means for developing an electrical signal representative of the length of control line payed out; and depth control circuit means coupled to said measuring means, to said generating means and to said developing means and to said drive means for correlating depth, line length and distance from the bottom information and responsive to said electrical signals representative of such information for developing control signals applied to said drive means for actuating said drive means to maintain the end of said control line at a selected depth from the bottom as the water depth varies.

6. The apparatus as defined in claim 5 wherein said depth measuring means comprises a fathometer.

7. The apparatus as defined in claim 6 wherein said developing means comprises a counter coupled to said reel for supplying electrical signals indicating the length of line payed out from said reel.

8. A powered trolling apparatus for use on a vessel comprising:

a frame member;

a reel mounted to said frame member and including a control line coupled thereto;

drive means coupled to said reel for paying out and retrieving said control line from said reel such that an end of said control line can be immersed in the water;

fathometer means for measuring the depth of water through which the vessel is passing and developing an electrical signal representative thereof;

means for generating an electrical signal representative for a selectable distance from the bottom at which an end of said control line is to be maintained;

counter means coupled to said reel for developing an electrical signal representative of the length of control line payed out; and depth control circuit means including a scaling circuit coupled to said counter for converting the signal from said counter to a signal representing the equivalent depth of said end of said control line, said circuit means coupled to said fathometer, to said generating means, and to said drive means for correlating depth, line length and distance from the bottom information and responsive to said electrical signals representative of such information for developing control signals applied to said drive means for actuating said drive means to maintain the end of said control line at a selected distance from the bottom as the water depth varies.

9. The apparatus as defined in claim 8 wherein said depth control circuit means further includes a first subtracter coupled to said scaling circuit and to said fathometer for providing a difference signal at an output terminal of said first subtracter representative of the distance of said end of said control line from the bottom.

10. The apparatus as defined in claim 9 wherein said depth control circuit means further includes a second subtracter circuit coupled to said output terminal of said first subtracter and to said generating means to provide a signal at an output terminal thereof which is representative of the distance said end of said control line is from the selected distance from the bottom.

11. The apparatus as defined in claim 10 wherein said depth control circuit means further includes threshold detecting means coupled to said output terminal of said second subtracter for providing said control signals applied to said drive means.

12. The apparatus as defined in claim 11 wherein said depth control circuit means further includes means for delaying the application of the output signal from said fathometer to said first subtracter to compensate for the relative position in said end of said control line with respect to the vessel as the vessel travels through the water.

13. A powered trolling apparatus for use on a vessel comprising:

a frame member;

a reel mounted to said frame member and including a control line coupled thereto;

drive means coupled to said reel for paying out and retrieving said control line from said reel such that an end of said control line can be immersed in the water;

means for detecting the temperature of water at a reference point on said control line;

a temperature control circuit coupled to said detecting means for providing control signals for actuating said drive means to pay out or retrieve said control line to maintain said reference point on said line within a desired temperature range in the water;

means for measuring the depth of water through which the vessel is passing and developing an electrical signal representative thereof;

means for generating an electrical signal representative of a selectable distance from the bottom at which said reference point of said control line is to be maintained;

means for developing an electrical signal representative of the length of control line payed out;

depth control circuit means coupled to said measuring means, to said generating means and to said developing means for correlating depth, line length and distance from the bottom information and responsive to said electrical signals representative of such information for developing control signals for actuating said drive means to maintain the end of said control line at a selected depth from the bottom as the water depth varies; and means selectively coupling one of said temperature control circuit or said depth control circuit means to said drive means for applying the respective control signals therefrom to said drive means for maintaining said reference point on said control line at a desired temperature in the water or at a desired depth from the bottom respectively.

* * * * *

UNITED STATES PATENT AND TRADEMARK OFFICE
CERTIFICATE OF CORRECTION

PATENT NO. : 3,922,808
DATED : December 2, 1975
INVENTOR(S) : James E. Rieth et al It is certified that error appears in the above-identified patent and that said Letters Patent are hereby corrected as shown below:

```
Column 3, line 66
    "and SCR" should be ---an SCR---
Column 4, line 52
    "SCR's" should be ---SCRs---
Column 5, line 13
    "SCR's" should be ---SCRs---
Column 5, line 27
    "to positive" should be ---no positive---
Column 5, line 27
    "SCR's" should be ---SCRs---
Column 5, line 50
    "132. A" should be ---132, a---
Column 6, line 12
    "as" should be ---is---
Column 8, line 25
    "trolling" should be ---of---
Column 8, line 35
    "inn" should be ---in---
Column 9, line 4
    "P'" should be ---B+---
Column 11, line 43, Claim 8
    "for" should be ---of---
Column 12, line 20, Claim 12
    "in" should be ---of---
```

Signed and Sealed this eleventh Day of May 1976

[SEAL]

Attest:

RUTH C. MASON
Attesting Officer

C. MARSHALL DANN
Commissioner of Patents and Trademarks